United States Patent
Bergmann et al.

(10) Patent No.: US 12,294,100 B2
(45) Date of Patent: May 6, 2025

(54) MODULAR SYSTEM AND METHOD FOR PRODUCING DESIGN VARIANTS OF A HOUSING ELEMENT FOR AN ELECTRIC STORAGE DEVICE OF A MOTOR VEHICLE

(71) Applicant: Bayerische Motoren Werke Aktiengesellschaft, Munich (DE)

(72) Inventors: Clemens Bergmann, Munich (DE); Jan Danneberg, Munich (DE); Marc Reinstettel, Munich (DE); Martin Schiebel, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 403 days.

(21) Appl. No.: 17/763,721

(22) PCT Filed: Oct. 20, 2020

(86) PCT No.: PCT/EP2020/079432
§ 371 (c)(1),
(2) Date: Mar. 25, 2022

(87) PCT Pub. No.: WO2021/083722
PCT Pub. Date: May 6, 2021

(65) Prior Publication Data
US 2022/0344762 A1    Oct. 27, 2022

(30) Foreign Application Priority Data
Oct. 28, 2019   (DE) ............... 10 2019 129 047.3

(51) Int. Cl.
*H01M 50/249*   (2021.01)
*B60K 1/04*   (2019.01)
*H01M 50/24*   (2021.01)

(52) U.S. Cl.
CPC ............ *H01M 50/249* (2021.01); *B60K 1/04* (2013.01); *H01M 50/24* (2021.01); *B60K 2001/0438* (2013.01); *H01M 2220/20* (2013.01)

(58) Field of Classification Search
CPC ............ H01M 50/249; H01M 50/24; H01M 2220/20; B60K 1/04; B60K 2001/0438
See application file for complete search history.

(56) References Cited

U.S. PATENT DOCUMENTS 10,720,620 B1 *   7/2020   Grace
10,797,284 B2   10/2020   Herrmann et al.
(Continued)

FOREIGN PATENT DOCUMENTS

CN   105144425 A   12/2015
CN   109565010 A   4/2019
(Continued)

OTHER PUBLICATIONS

International Search Report (PCT/ISA/210) issued in PCT Application No. PCT/EP2020/079737 dated Dec. 21, 2020 with English translation (four (4) pages).
(Continued)

*Primary Examiner* — James A Shriver, II
*Assistant Examiner* — Nicholas R. Kandas
(74) *Attorney, Agent, or Firm* — Crowell & Moring LLP

(57) ABSTRACT

A modular system produces design variants of a housing element for a storage housing of a storage device which has multiple storage cells that can be arranged in a receiving area of the storage housing. At least one universal housing part delimits the receiving area. A design variant-specific first reinforcing element, and a design variant-specific second reinforcing element which differs from the first reinforcing element are provided, wherein the first design variant of the
(Continued)

housing element has the housing part and the first reinforcing element, by means of which the housing part is reinforced in the first design variant, and the second design variant of the housing element has the housing part and the second reinforcing element, by means of which the housing part is reinforced in the second design variant.

7 Claims, 3 Drawing Sheets

(56) References Cited

U.S. PATENT DOCUMENTS

| | | | |
|---|---|---|---|
| 11,133,553 | B2 | 9/2021 | Kim et al. |
| 11,518,227 | B2 * | 12/2022 | Schmidt ................. B62D 25/20 |
| 11,800,067 | B2 * | 10/2023 | Thiel |
| 2011/0162431 | A1 | 7/2011 | Flehmig et al. |
| 2013/0161105 | A1 | 6/2013 | Maguire et al. |
| 2014/0182966 | A1 | 7/2014 | Fisk et al. |
| 2015/0009382 | A1 | 1/2015 | Ito et al. |
| 2016/0006008 | A1 | 1/2016 | Volz |
| 2016/0233468 | A1 | 8/2016 | Nusier et al. |
| 2017/0025720 | A1 | 1/2017 | Kaiser et al. |
| 2019/0148690 | A1 | 5/2019 | Newman |
| 2019/0221797 | A1 | 7/2019 | Nierfoff et al. |
| 2019/0337402 | A1 | 11/2019 | Günther |
| 2020/0076028 | A1 | 3/2020 | Darbandi et al. |
| 2021/0146766 | A1 | 5/2021 | Haberl et al. |
| 2021/0170853 | A1 | 6/2021 | Schmidt et al. |

FOREIGN PATENT DOCUMENTS

| | | | | |
|---|---|---|---|---|
| CN | 110313084 | A | | 10/2019 |
| DE | 195 24 235 | A1 | | 1/1997 |
| DE | 10 2007 038 713 | A1 | | 2/2009 |
| DE | 10 2009 043 635 | A1 | | 4/2011 |
| DE | 10 2012 223 062 | A1 | | 6/2013 |
| DE | 11 2012 001 388 | T5 | | 12/2013 |
| DE | 10 2016 213 832 | A1 | | 2/2018 |
| DE | 10 2017 104 360 | A1 | | 9/2018 |
| DE | 10 2017 005 329 | A1 | | 12/2018 |
| DE | 10 2017 005 401 | A1 | | 12/2018 |
| DE | 10 2017 211 372 | A1 | | 1/2019 |
| DE | 10 2018 202 413 | A1 | | 8/2019 |
| DE | 10 2018 206 100 | A1 | | 10/2019 |
| DE | 10 2018 120 268 | A1 | | 2/2020 |
| DE | 102019132026 | A1 * | 5/2021 | ............... B60K 1/04 |
| EP | 1 898 479 | A1 | | 3/2008 |
| EP | 2 332 761 | A1 | | 6/2011 |
| EP | 2 465 719 | A1 | | 6/2012 |
| EP | 2 468 609 | A2 | | 6/2012 |

OTHER PUBLICATIONS

German-language Written Opinion (PCT/ISA/237) issued in PCT Application No. PCT/EP2020/079737 dated Dec. 21, 2020 (six (6) pages).
German-language Search Report issued in German Application No. 10 2019 129 045.7 dated Sep. 8, 2020 with partial English translation (12 pages).
International Search Report (PCT/ISA/210) issued in PCT Application No. PCT/EP2020/079432 dated Feb. 15, 2021 with English translation (four (4) pages).
German-language Written Opinion (PCT/ISA/237) issued in PCT Application No. PCT/EP2020/079432 dated Feb. 15, 2021 (five (5) pages).
German-language Search Report issued in German Application No. 10 2019 129 047.3 dated Aug. 21, 2020 with partial English translation (13 pages).
U.S. Appl. No. 17/763,724, filed Mar. 25, 2022.
English translation of Office Action issued in Chinese Application No. 202080068330.8 dated Dec. 30, 2023 (5 pages).
English translation of Office Action issued in Chinese Application No. 202080068771.8 dated Dec. 22, 2023 (7 pages).
U.S. Non-Final Office Action issued in U.S. Appl. No. 17/763,724 dated Apr. 26, 2024 (14 pages).

* cited by examiner

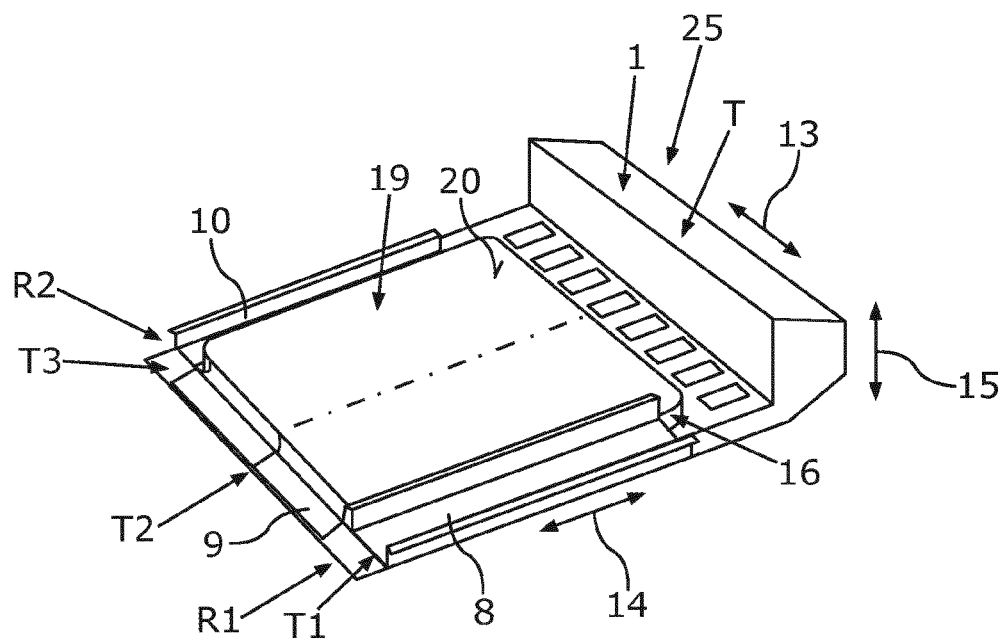
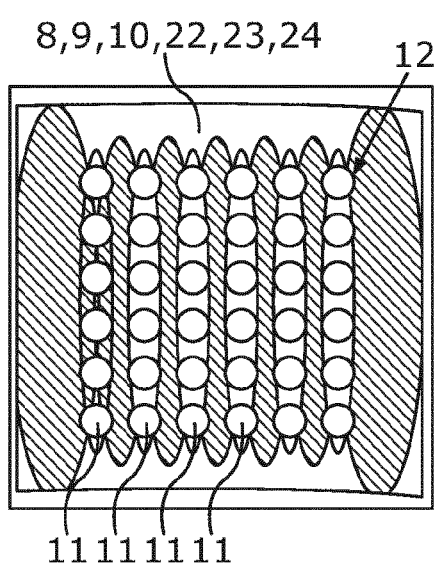
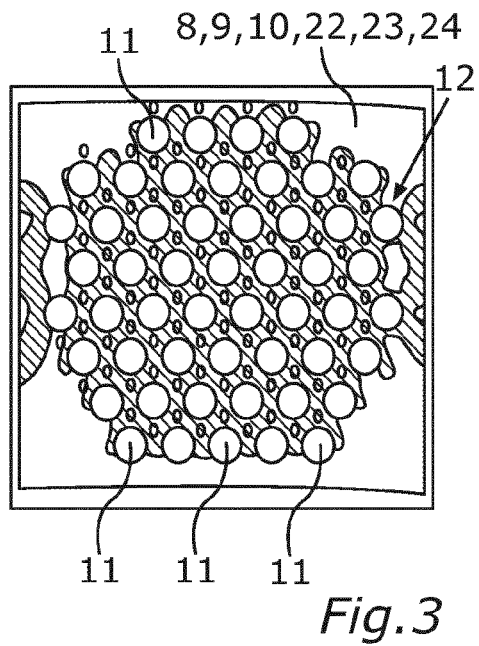
Fig.1
Fig.2
Fig.3

MODULAR SYSTEM AND METHOD FOR PRODUCING DESIGN VARIANTS OF A HOUSING ELEMENT FOR AN ELECTRIC STORAGE DEVICE OF A MOTOR VEHICLE

CROSS-REFERENCE TO RELATED APPLICATION

This application contains subject matter related to U.S. application Ser. No. 17/763,724, entitled "Storage Device For Storing Electric Energy For A Motor Vehicle, Motor Vehicle, And Method For Producing A Storage Housing For A Storage Device" filed on even date herewith.

BACKGROUND AND SUMMARY

The invention relates to a modular system and to a method for producing at least two design variants of a housing element for a storage housing of a storage device for a motor vehicle, the storage device being configured for storing electrical energy.

A panel assembly is known from DE 11 2012 001 388 T5. The panel assembly has a main panel with an acoustically active region, and has a primary adhesive layer and a multi-layer patch with at least two individual patches and at least one auxiliary adhesive layer. The primary adhesive layer fastens the multi-layer patch on the main plate in the acoustically active region for sound damping.

Furthermore, an energy-absorbing and distributing side impact system for a vehicle is known from EP 2 468 609 A2.

It is the object of the present invention to provide a modular system and a method such that different design variants of a storage device for a motor vehicle, the storage device being configured for storing electrical energy, can be realized in a particularly simple and appropriate manner.

This object is achieved according to the invention by a modular system and by a method having the features of the independent claims. Advantageous refinements of the invention are the subject matter of the dependent claims.

A first aspect of the invention relates to a modular system for producing at least two, in particular different, design variants of a housing element for a storage housing of a storage device, the storage device being configured for storing electrical energy or electrical current and having a plurality of storage cells, which can be arranged in a receiving space of the storage housing, and in the storage cells of the storage device the electrical energy or the electrical current can be stored. A first of the design variants is installed or used, for example, in a first variant of the motor vehicle, wherein, for example, the second design variant is installed or used in a second variant of the motor vehicle, which is in the form, for example, of a motor car, in particular a passenger motor car. The variants of the motor vehicle differ from one another, for example in respect of their fittings, in particular special fittings. Furthermore, it is contemplated that the variants of the motor vehicle are different types of vehicle. In particular, it is contemplated that the different variants of the motor vehicle differ from one another in their respective vehicle weights.

The motor vehicle is in the form here, for example, of a hybrid or electric vehicle, in particular in the form of a battery electric vehicle, and, in its fully manufactured state, comprises the storage device and therefore the first or second design variant of the housing element. In addition, in its fully manufactured state, the motor vehicle comprises, for example, at least one electric machine, by means of which the motor vehicle can be driven, in particular purely, electrically. For this purpose, the electric machine is operated in a motor mode and therefore as an electric motor, by means of which the motor vehicle can be driven, in particular purely, electrically. In order to operate the electric machine in the motor mode, the electric machine is supplied with electrical energy or electrical current, which electrical energy or electrical current is stored in the storage device, in particular in storage cells. In order to be able to realize a particularly great electrical power for, in particular purely, electrically driving the motor vehicle, the storage device has, for example, an electrical voltage, in particular an electrical operating or nominal voltage, which is preferably greater than 50 volts, in particular more than 60 volts, and preferably is several hundred volts. The storage device is therefore preferably configured as a high-voltage component. For example, the storage device can be configured as a battery, in particular as a high-voltage battery (HV battery).

The modular system has at least one housing part which is universal across design variants and at least partially delimits the receiving space. The feature that the housing part is universal across design variants should be understood as meaning in particular that both the first design variant and the second design variant have the same, in particular structurally identical, housing part. This means that the housing part is usable or is used both for the first design variant and for the second design variant. Expressed again in other words, in the fully manufactured state of the design variants, the housing parts of the design variants are identical, in particular structurally identical.

The modular system has a first reinforcing element which is specific to design variants and a second reinforcing element which is specific to design variants and differs from the first reinforcing element. It is provided here that the first design variant has the housing part and the first reinforcing element, by means of which the housing part is reinforced in the first design variant. The second design variant has the housing part and the second reinforcing element, by means of which the housing part is reinforced in the second design variant. The features that the first reinforcing element is specific to design variants and is used in the first design variant in order to reinforce the housing part in the first design variant can be understood as meaning in particular that, with reference to the design variants, the first reinforcing element is used exclusively in the first design variant, but not in the second design variant, and therefore the second design variant is preferably free from the first reinforcing element. Expressed again in other words, the first reinforcing element is not used in the second design variant. Accordingly, for example, the features that the second reinforcing element is specific to design variants and is used in the second design variant in order to reinforce the housing part in the second design variant can be understood as meaning in particular that, with reference to the design variants, the second reinforcing element is used exclusively in the second design variant, and not also in the first design variant. It is therefore preferably provided that the first design variant is free from the second reinforcing element. Expressed again in other words, the second reinforcing element is used in the second design variant, but not also in the first design variant.

The modular system according to the invention makes it possible for the housing part to be able to be appropriately reinforced or stiffened depending on the selection of the reinforcing element, that is to say depending on which of the reinforcing elements is used in order to reinforce the housing part. It is thereby possible to adapt the housing element, which, in its fully manufactured state, has the housing part and the respective reinforcing element associated therewith, appropriately and simply and cost-effectively to different load situations or loadings.

In particular, for example, the housing element can thereby be adapted particularly simply and favorably in terms of time and costs to the different variants of the motor vehicle. The different variants of the motor vehicle lead, for example, to different requirements made of the housing element. These different requirements can be taken into account or these different requirements can be satisfied in a simple manner by the invention by the housing part being reinforced either by means of the first reinforcing element or by means of the second reinforcing element.

In order to be able to reinforce the housing part and therefore the housing element particularly effectively and favorably in terms of construction space, weight and costs, it is provided according to the invention that the respective reinforcing element intrinsically has a plurality of through openings which are spaced apart from one another and are separated from one another. It should be understood by this as meaning in particular that, when considering the reinforcing element by itself, the respective through opening is formed continuously and therefore as a hole or through hole. Since, in the fully manufactured state of the housing element, the housing part is provided with the respective reinforcing element and is thereby connected, the housing part can cover and therefore close the through openings. The feature that the through openings are spaced apart from one another and separated from one another can be understood as meaning in particular that respective wall regions of the respective reinforcing element are arranged between the through openings. It is preferably provided here that the respective through opening is delimited in a completely encircling manner along its circumferential direction by the respective reinforcing element and is thereby closed.

Since the respective reinforcing element preferably has the through openings, which are also referred to as holes, the reinforcing element is produced as a perforated plate, in particular as a perforated panel, and the reinforcing element is also referred to as perforated plate, sheet metal plate, patch or patch plate. Since, in the respective design variant, the housing part is provided with the respective reinforcing element and is thereby reinforced by means of the respective reinforcing element, the housing part is so to say patched with the respective reinforcing element.

In order to be able to reinforce the housing part particularly appropriately, it is provided, in a further refinement of the invention, that the respective through openings form a respective pattern of perforations of the respective reinforcing element. It is preferably provided here that the reinforcing elements differ from one another in respect of their pattern of perforations and/or in respect of a respective shape of the respective through openings. This embodiment is based on the finding that, by means of different patterns of perforations or by varying the pattern of perforations appropriately, different or variable anisotropic properties, in particular material characteristic values, of the respective housing element can be obtained as a whole. By this means, the material characteristic values can be adapted, for example, to an energy map of an accident or loading test, for example a bollard drop test, or a load situation, or to different energy maps of different load situations, for example bollard drop tests. In other words, the housing part can be appropriately reinforced by means of the reinforcing elements in such a manner and thereby appropriately adapted to different loadings in such a manner that a particularly advantageous accident behavior of the storage housing can be realized.

It has furthermore been shown to be particularly advantageous if the reinforcing elements differ from one another in respect of their wall thicknesses and/or in respect of their material from which the reinforcing elements are formed. It is thus contemplated that the first reinforcing element is formed from a first material and the second reinforcing element from a second material. The first material is, for example, a first metallic material, wherein the second material can be a second metallic material. In particular, the first material can be a first steel, wherein the second material can be a second steel. The first material is, for example, a high-strength steel, wherein the second material can be a steel which is different from the high-strength steel.

In a third design variant of the housing element, it can be provided that the third design variant has the housing part, wherein, in the third design variant, the housing part is free from the first reinforcing element and free from the second reinforcing element and preferably free from reinforcing elements or stiffening elements formed separately from the housing part. The design variants can thereby be realized particularly simply and favorably in terms of time and costs. However, the third design variant also comprises the housing part which is universal across design variants. The housing part which is universal across design variants thus forms a base which is identical for all design variants or in all design variants. In particular, the reinforcing elements can differ from one another in respect of the qualities of their materials, that is to say in respect of their material qualities, in particular steel qualities. Alternatively or additionally, it is contemplated that the reinforcing elements differ from one another in respect of their respective heat treatments. For example, one of the reinforcing elements can be heat-treated, while the other reinforcing element is not heat-treated, or both reinforcing elements are heat-treated, but, for example, both reinforcing elements are heat-treated differently. Alternatively or additionally, the reinforcing elements can differ from one another in respect of their sizes and/or in respect of their shapes.

If, for example, the reinforcing elements differ from one another in respect of their patterns of perforations, it can be provided that the patterns of perforations differ from one another in respect of their distances between the respective through openings. Overall, it can be seen that different, in particular anisotropic, properties of the housing element can be realized particularly simply and advantageously in terms of time and costs by appropriate selection and use of the respective reinforcing element.

A further embodiment is distinguished in that, in the first design variant, the first reinforcing element is arranged at least in a partial region of the housing part. In the second design variant, the second reinforcing element is arranged at least in a part of the partial region, in particular in the same partial region, of the housing part. It is therefore preferably provided that, for example, in the second design variant, the second reinforcing element is provided instead of the first reinforcing element. Furthermore, it is preferably provided that, in the first design variant, the first reinforcing element is provided instead of the second reinforcing element. As a result, the different design variants of the housing element can be produced particularly simply and, for example, by means of the same forming tool, in particular deep drawing tool.

In particular, it can be provided that the partial region or the part of the partial region is provided with the respective reinforcing element. It is contemplated here that the respective reinforcing element overlaps the partial region or part, in particular flatly. For example, the respective reinforcing element is connected at least substantially flatly to the partial region or part.

It has been shown to be particularly advantageous here if the respective reinforcing element is connected in an integrally bonded manner, in particular adhesively bonded, in particular flatly, to the housing part, in particular to the partial region or part. For example, the respective reinforcing element is connected to the housing part, in particular to the partial region or part, by means of an adhesive, which is also referred to as glue, and thereby adhesively bonded. The adhesive preferably forms an adhesive layer which is arranged between the housing part and the respective reinforcing element. A particularly advantageous transmission of shearing stresses can thereby be ensured. The adhesive is preferably formed from at least one polymer and is therefore designed as a polymer adhesive.

It has furthermore been shown to be particularly advantageous if the respective reinforcing element is welded to the housing part, in particular to the partial region or part. It is contemplated here that the respective reinforcing element is welded to the housing part by spot welding. A particularly advantageous reinforcement of the housing part can thereby be ensured.

Finally, it has been shown to be particularly advantageous if, in the installed position of the housing element, the respective reinforcing element is arranged in an outer lateral edge region of the housing part or housing element in the transverse direction of the vehicle. The housing element takes up its installed position in the fully manufactured state of the motor vehicle. By arranging the reinforcing element in the edge region, the housing part can be reinforced particularly advantageously in particular in the edge region. As a result, particularly advantageous deformation behaviors of the housing element can be realized in particular in respect of a side impact, and therefore, for example, the storage cells can be particularly advantageously protected even in the event of a side impact.

The respective reinforcing element and/or the housing part is preferably formed from a metallic material. The housing part can be formed as a single piece. Furthermore, it is conceivable that the housing part has at least or precisely two structural elements formed separately from one another and connected to one another. Furthermore, it is conceivable that the partial region or part in which the reinforcing element is arranged in the respective design variant forms a part of a sill of a self-supporting body of the motor vehicle which is preferably in the form of a motor car, in particular passenger motor car. In other words, in the fully manufactured state of the motor vehicle, the self-supporting body of the vehicle has side sills. At least one of the side sills is at least partially formed here by the partial region or part of the housing part, in the partial region or part of which the respective reinforcing element is arranged. Particularly advantageous stabilization or strength or rigidity of the side sill can thereby be realized, and therefore the storage cells can be particularly advantageously protected, in particular in the event of a side impact.

It has furthermore been shown to be particularly advantageous if the housing part is a floor element of a floor of a self-supporting body of the motor vehicle. This means that the housing part is part of the body, which is also referred to as bodyshell. Expressed again in other words, the housing part is integrated in the floor, and therefore, for example, the storage device can be installed particularly advantageously on or in the motor vehicle. In addition, the storage cells can thereby be particularly advantageously protected.

A second aspect of the invention relates to a method for producing at least two design variants of a housing element for a storage housing of a storage device for a motor vehicle, the storage device being configured for storing electrical energy and having a plurality of storage cells, which can be arranged in a receiving space of the storage housing and in which the electrical energy can be stored. In particular, in the method, the different design variants are produced by means of a modular system according to the first aspect of the invention. In the first step of the method, a first reinforcing element is provided. In a second step of the method, a second reinforcing element which is different from the first reinforcing element is provided. The respective reinforcing element is specific to design variants, and therefore, for example, with reference to the design variants, the first reinforcing element is used exclusively in the first design variant or for the first design variant, but not for the second design variant, and wherein, for example, with reference to the design variants, the second reinforcing element is used exclusively for the second design variant or in the second design variant, but not in the first design variant. In a third step of the method, at least one basic element which is universal across design variants is provided from which a housing part which is universal across design variants and at least partially delimits the receiving space is produced. In the method, either the housing part is reinforced by means of the first reinforcing element, as a result of which the first design variant of the housing element is produced. In this case, for example, the housing part is provided with and connected to the first reinforcing element. Or the housing part is reinforced by means of the second reinforcing element, as a result of which the second design variant of the housing element is produced. For this purpose, for example, the housing part is provided with and connected to the second reinforcing element. Advantages and advantageous refinements of the first aspect of the invention can be considered to be advantages and advantageous refinements of the second aspect of the invention, and vice versa.

The housing part is produced from the basic element, for example by forming, in particular by deep drawing. Thus, for example, the basic element is formed, in particular deep drawn, by means of a forming tool, in particular by means of a deep drawing tool, as a result of which the housing part is produced from the basic element which is in the form, for example, of a plate, in particular a sheet metal plate.

The first reinforcing element is produced, for example, from a first reinforcing plate, in particular from a first sheet metal reinforcing plate, by, for example, the first reinforcing plate being formed, in particular deep drawn. The second reinforcing element is produced, for example, from a second reinforcing plate, in particular from a second sheet metal reinforcing plate, by, for example, the second reinforcing plate being formed, in particular deep drawn. The respective reinforcing element is provided by the production of the respective reinforcing element. The respective reinforcing plate is in the form, for example, of a perforated plate which has respective through openings which are spaced apart from one another and are separated from one another. The reinforcing plates differ from one another. For example, the reinforcing plates differ in respect of their pattern of perforations formed by the through openings and/or in respect of their materials from which the reinforcing plates are formed, and/or in respect of their shapes and/or sizes and/or material qualities. For example, for the production of the first reinforcing element, the first reinforcing plate is formed by means of the forming tool by means of which the housing part is formed, in particular deep drawn.

It has been shown to be particularly advantageous here if, in the method, from the reinforcing plates which are for example provided, one of the reinforcing plates is selected. The basic element, in particular the basic plate, is then provided with, in particular connected to, the selected reinforcing plate. For example, the reinforcing plate is connected in an integrally bonded manner, in particular adhesively bonded and/or welded, to the basic element.

After the selected reinforcing plate is connected to the basic element, the basic element and the reinforcing plate connected previously to the basic element is introduced, in particular placed, for example, into the forming tool, in particular the deep drawing tool, whereupon the basic element and the reinforcing plate connected to the basic element are simultaneously or jointly formed, in particular deep drawn, by means of the forming tool, in particular the deep drawing tool. By this means, the respective design variant of the housing element can be produced particularly favorably in terms of time and costs. In addition, a particularly advantageous reinforcement of the housing part and therefore of the housing element as a whole can be provided.

Further details of the invention emerge from the description below of preferred exemplary embodiments with the associated drawings.

BRIEF DESCRIPTION OF THE DRAWINGS

FIG. 1 is a schematic perspective view of a housing part for a storage device according to an embodiment of the invention for storing electrical energy for a motor vehicle;

FIG. 2 is a schematic top view of a first embodiment of a reinforcing element for the, in particular local, reinforcement of the housing part;

FIG. 3 is a schematic top view of the reinforcing element according to a second embodiment;

In the figures, identical or functionally identical elements are provided with the same reference signs.

DETAILED DESCRIPTION OF THE DRAWINGS

Figure 7:
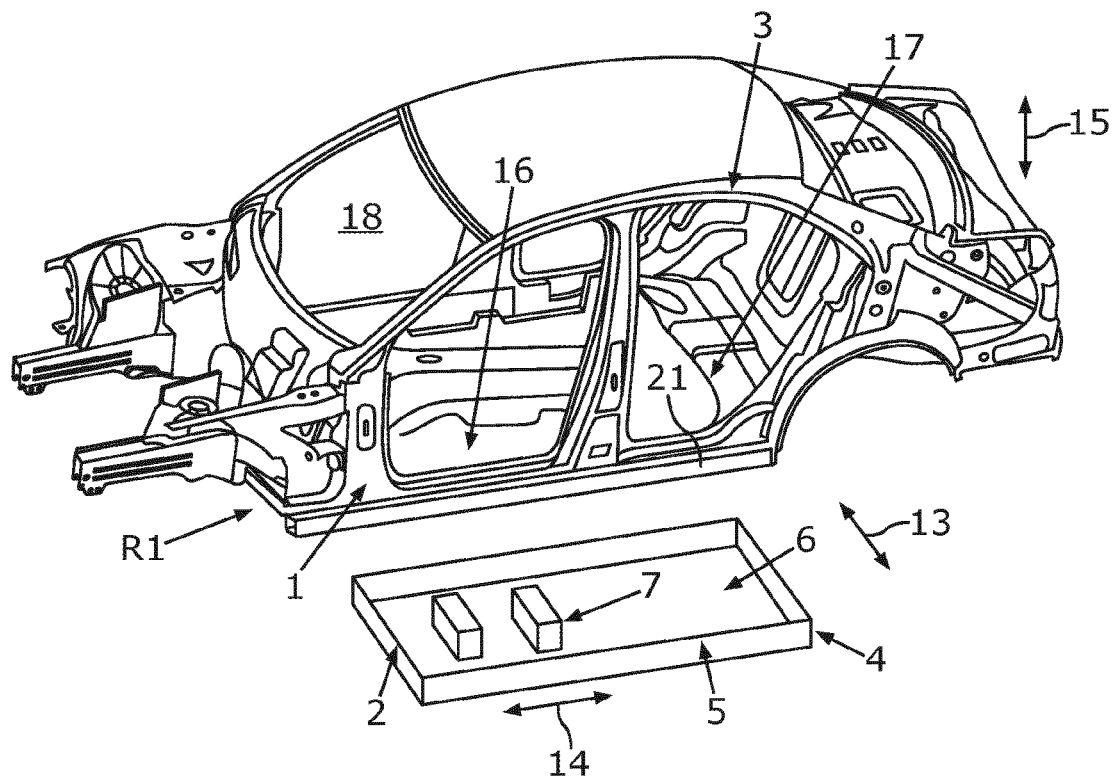
FIG. 7 is a schematic and perspective exploded view of the storage device.

FIG. 1 shows, in a schematic and perspective top view, a first housing part 1 for a storage device 2, which can be seen from FIG. 7 where it is shown in a schematic exploded view, for storing electrical energy for a motor vehicle. This means that the motor vehicle, which is preferably in the form of a motor car, in particular a passenger motor car, in its fully manufactured state has the storage device 2 and therefore the housing part 1. In addition, in its fully manufactured state, the motor vehicle has a self-supporting body 3 which can be seen from FIG. 7 and is also referred to as a bodyshell.

The storage device 2 has a storage housing 4 which comprises the housing part 1 and at least or precisely one second housing part 5. The housing parts 1 and 5 are, for example, formed separately from each other and are connected to each other. The storage housing 4 comprises or delimits a receiving space 6 in which a plurality of storage cells 7, illustrated in particularly schematic form in FIG. 7, for storing the electrical energy are accommodated. The receiving space 6 is partially delimited by the housing part 1 and partially by the housing part 5, and therefore the housing parts 1 and 5 in a state connected to one another and therefore in an assembled state delimit the receiving space 6 as a whole or completely.

The motor vehicle is in the form of a hybrid or electric vehicle, in particular battery electric vehicle, and, in its fully manufactured state, comprises at least one electric machine by means of which the motor vehicle can be driven, in particular purely, electrically. For the, in particular purely, electrical driving of the motor vehicle by means of the electric machine, the electric machine is operated in a motor mode and therefore as an electric motor. For this purpose, the electric machine is supplied with electrical energy or electrical current, which electrical energy or electrical current is stored in the storage device 2, in particular in the storage cells 7. Furthermore, it is contemplated to operate the electric machine in a generator mode and therefore as a generator. In the generator mode, the electric machine is driven by the moving motor vehicle and therefore by kinetic energy of the motor vehicle. The generator is used to convert the kinetic energy of the motor vehicle into electrical energy which is provided by the generator. The electrical energy provided by the generator can be fed into the storage cells 7 and therefore stored in the storage cells 7 or in the storage housing 4.

In order now to be able to realize particularly advantageous, in particular mechanical, properties of the housing part 1 and therefore of the storage housing 4 as a whole, the housing part 1 is in each case provided, in respect of partial regions T1, T2 and T3, which are preferably spaced apart from one another, with at least or precisely one reinforcing element 8, 9 and 10, which is formed separately from the housing part 1, and therefore the housing part 1 is reinforced in the partial regions T1, T2 and T3 by means of the respective reinforcing elements 8, 9 and 10.

As can be seen in particular in an overall view of FIG. 2 which shows a respective first embodiment of the respective reinforcing element 8, 9 and 10, the respective reinforcing element 8, 9 and 10 intrinsically has, that is to say if viewed by itself, a plurality of through openings 11 which are separated from one another and are spaced apart from one another. The through openings 11 form a pattern of perforations 12 which, in the first embodiment, is designed in the manner of a matrix and therefore in rows and columns. In other words, in the first embodiment, the through openings 11 are arranged in rows and columns, wherein the respective rows have the same number of through openings 11. The respective columns also have the same number of through openings 11.

It can be seen from FIG. 1 that the respective reinforcing element 8, 9 and 10 overlaps the respective associated partial region T1, T2 and T3, respectively. In addition, it is provided that the respective reinforcing element 8, 9 and 10 is adhesively bonded to the respective associated partial region T1, T2 and T3, respectively. For example, the respective reinforcing element 8, 9 and 10 is adhesively bonded here by means of an adhesive, and in particular at least substantially flatly, to the respectively associated partial region T1, T2 and T3. The adhesive therefore forms an adhesive layer which is arranged between the respective reinforcing element 8, 9 and 10 and the respectively associated partial region T1, T2 and T3. The adhesive and therefore the adhesive layer are preferably formed from a polymer. By this means, a particularly advantageous connection of the reinforcing elements 8, 9 and 10 to the partial regions T1, T2 and T3, respectively, can be realized. In particular, in addition to the adhesive bonding, it is contemplated that the reinforcing elements 8, 9 and 10 are welded to the housing part 1, in particular to the respective partial regions T1, T2 and T3, respectively, in particular by spot welding.

It has furthermore been shown to be particularly advantageous if the reinforcing elements 8, 9 and 10 are formed without the housing part 1 from a metallic material, in particular from a steel.

FIGS. 1 and 7 show the housing part 1 and the storage device 2, respectively, in their installed position. The storage device 2 and therefore the housing part 1 take up the storage position in the fully manufactured state of the motor vehicle. With reference to the installed position of the storage device 2, the reinforcing elements 8 and 10 are arranged here in respective outer lateral edge regions R1 and R2 of the housing part 1, in particular of the body 3, in the transverse direction of the vehicle. The transverse direction of the vehicle is shown in FIG. 1 by a double arrow 13, and the longitudinal direction of the vehicle is shown in FIG. 1 by a double arrow 14. In addition, the vertical direction of the vehicle is shown by a double arrow 15.

It can be seen particularly readily in an overall view of FIG. 7 that the housing part 1 is a floor element 16, which is also referred to as a floor panel or is configured as a floor panel, of a floor 17, which is also referred to as the main floor, of the self-supporting body 3. This means that the housing part 1 is part of the body 3 and is therefore a body component. In other words, the housing part 1 is part of the previously mentioned bodyshell. The floor element 16 at least partially, in particular at least predominantly or entirely, delimits the interior 18 of the motor vehicle downward in the vertical direction of the vehicle. A footwell 19 which is formed by the floor element 16, faces upward in the vertical direction of the vehicle with reference to the installed position and which, for example, in the fully manufactured state of the motor vehicle, is covered with a lining element, in particular with a carpet, and is therefore lined, can be seen from FIG. 1. In addition, an upper side 20 of the floor element 16, the upper side facing upward in the vertical direction of the vehicle with reference to the installed position, can be seen in FIG. 1, the upper side 20 facing the interior 18 and in particular the lining element. The floor element 16 extends, for example, to the rear in the longitudinal direction of the vehicle until under a, in particular rear, seat bench of the motor vehicle, and therefore, for example, a part T of the floor element 16 is arranged below the seat bench in the vertical direction of the vehicle.

The housing part 1 can be intrinsically formed as a single piece. Furthermore, it is contemplated that the housing part 1 intrinsically has at least or precisely two structural elements which are formed separately from one another and are connected to one another and which therefore form the housing part 1 and therefore the floor element 16 as a whole.

The body 3 has two side sills which are spaced apart from each other in the transverse direction of the vehicle and extend at least in the longitudinal direction of the vehicle and of which the side sill which is on the left with reference to the forward direction of travel and is denoted by 21 in FIG. 7 can be seen in FIG. 7. The right side sill with reference to the forward direction of travel cannot be seen in FIG. 7. The partial region T1, which is provided with the reinforcing element 8 and is thereby reinforced by means of the reinforcing element 8, here forms a first part, in particular a first shell, of the side sill 21. The partial region T3 forms a first part, in particular a first shell, of the right side sill. A respective second part, in particular a respective second shell, of the respective side sill is formed, for example, by a respective further component of the body 3. In a fully manufactured state of the body 3 or of the motor vehicle, the respective parts of the respective side sill are assembled and connected to one another such that the respective parts of the respective side sill overall or entirely form the respective side sill. The side sills of the body 3 are therefore reinforced by means of the reinforcing elements 8 and 10. As a result, a particularly advantageous accident behavior of the housing part 1 can be realized, in particular with regard to a side impact. The storage cells 7 can consequently be particularly advantageously protected even in the event of a side impact.

Figure 4:
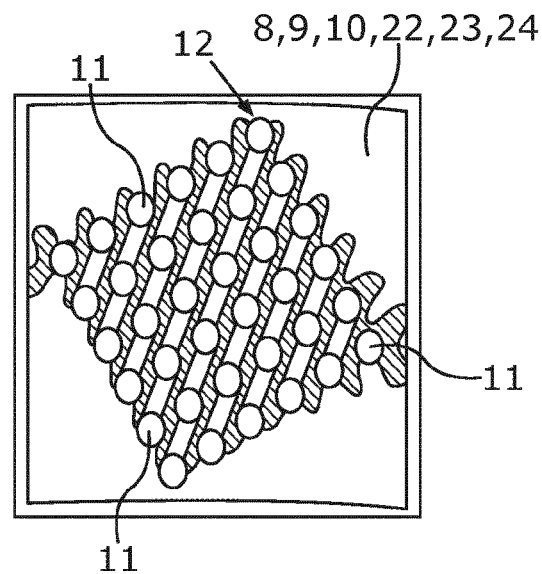
FIG. 4 is a schematic top view of the reinforcing element according to a third embodiment.

FIGS. 3 and 4 respectively show a second and third embodiment of the respective reinforcing element 8, 9 and 10. It can be seen from FIGS. 2 to 4 that the embodiments of the reinforcing elements 8, 9 and 10 differ from one another intrinsically with respect to the pattern of perforations 12 and/or in respect of an arrangement or a course of the pattern of perforations 12 with reference to the transverse direction of the vehicle and/or with reference to the longitudinal direction of the vehicle.

Figure 5:
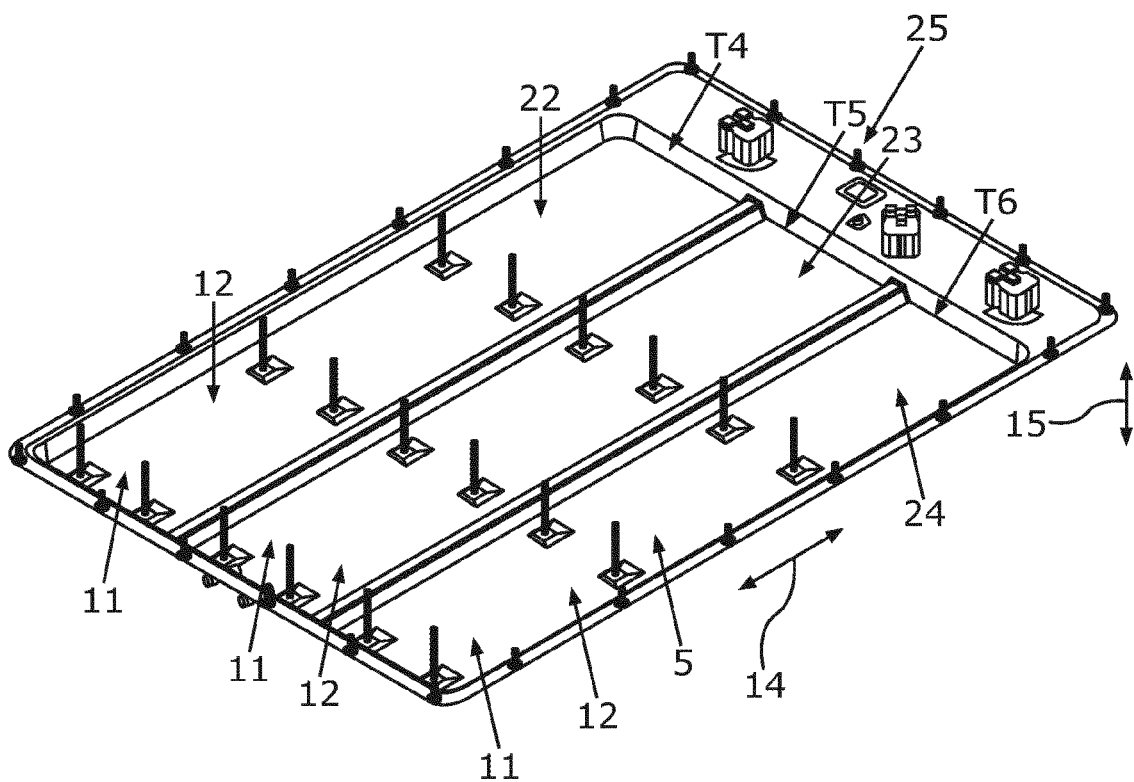
FIG. 5 is a schematic and perspective top view of a further housing part of the storage device.
Figure 6:
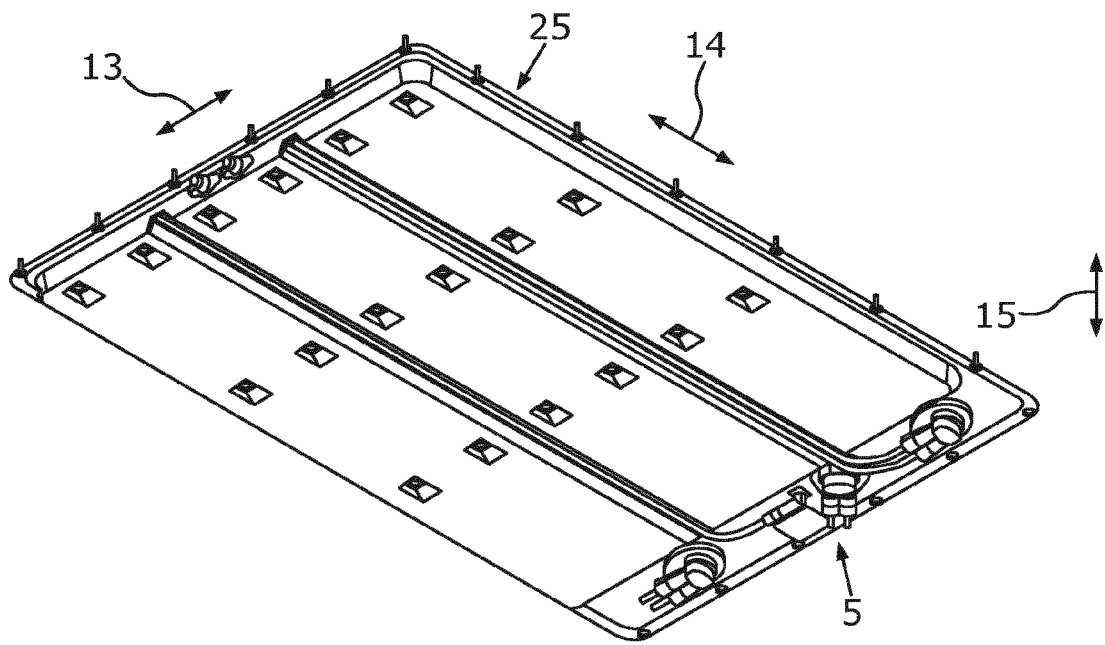
FIG. 6 is a schematic and perspective bottom view of the further housing part according to FIG. 4.

While FIG. 5 shows the housing part 5 in a schematic and perspective top view, FIG. 6 shows the housing part 5 in a schematic and perspective bottom view. In an overall view with FIG. 7, it can be seen that the housing part 5, which is formed separately from the housing part 1, is arranged below the housing part 1 in a fully manufactured state of the motor vehicle and here in the vertical direction of the vehicle. In contrast to the housing part 1, the housing part 5 is not part of the body 3, but rather is an add-on part which is attached to the body 3. The housing part 5 is also referred to as a floor panel or forms a floor panel since it at least partially, in particular at least predominantly or completely, covers the actual floor 17 or the floor element 16 downward in the vertical direction of the vehicle. Since, in contrast to the housing part 5, the housing part 1 is integrated in the body 3, the housing part 5, for example after production of the body 3, is arranged from the bottom upward in the vertical direction of the vehicle on the housing part 1, as a result of which the receiving space 6 is formed and closed. In particular, the housing part 5 is sealed gas-tightly and/or liquid-tightly against the housing part 1. The housing part 5 therefore forms so to say a cover, which is also referred to as a housing cover, of the storage housing 4.

In respective partial regions T4, T5 and T6, which are preferably spaced apart from one another, the housing part 5 here is also provided with in each case at least or precisely one reinforcing element 22, 23 and 24, and therefore the housing part 5 is reinforced by means of the reinforcing elements 22, 23 and 24 in the partial regions T4, T5 and T6, respectively. The previous and following statements with regard to the respective reinforcing elements 8, 9 and 10 can readily also be transferred to the respective reinforcing element 22, 23, 24, and vice versa. The respective reinforcing element 22, 23, 24 therefore intrinsically also has a plurality of through openings 11 which are separated from one another and spaced apart from one another and form a pattern of perforations 12. The respective reinforcing elements 8, 9, 10, 22, 23 and 24 are formed separately from one another and separately from the housing parts 1 and 5. For example, the reinforcing elements 22, 23 and 24 are adhesively bonded and/or welded to the housing part 5, in particular to the partial regions T4, T5 and T6.

While, for example, the reinforcing elements 8, 9 and 10 are arranged on an outer side of the housing part 1 facing away from the receiving space 6 and therefore outside the receiving space 6, the reinforcing elements 22, 23 and 24, for example, are arranged on an inner side of the housing part 5 facing the receiving space 6 and therefore in the receiving space 6.

A method for producing the storage housing 4 is described below. Within the context of the method, the respective housing part 1 or 5 is produced in such a manner or formed in such a manner that the respective housing part 1 or 5 in each case partially delimits the receiving space 6. For example, the respective housing part 1 or 5 is formed in such a manner or in particular deep drawn in such a manner that it is configured to be at least substantially shell-shaped at least in one region. For example, the shell-shaped region partially delimits the receiving space 6.

The respective housing part 1 or 5 is produced, for example, from a basic plate which is formed, in particular deep drawn. The basic plate can be formed as a single piece or else can have at least or precisely two structural elements which are formed separately from one another and are connected to one another, in particular welded. The basic plate is formed, in particular deep drawn, by means of a forming tool. For this purpose, the basic plate is placed into the forming tool.

The respective reinforcing element 8, 9, 10, 22, 23 and 24 is produced, for example, from a reinforcing plate which is also referred to as a hole plate or perforated patch and which is preferably likewise formed, in particular deep drawn. It is preferably provided here that the respective basic plate is provided with, in particular connected or preferably adhesively bonded to, the respective reinforcing plates forming the reinforcing elements 8, 9 and 10 and, respectively, 22, 23 and 24. As a result, for example, the basic plate and the respective reinforcing plates form an assembly which—after the basic plate has been connected to the reinforcing plate—is introduced, in particular placed, into the forming tool. The basic plate and the reinforcing plates previously connected to the basic plate are formed, in particular deep drawn, jointly, that is to say simultaneously, by means of the forming tool. The respective housing part 1 or 5 can thereby be reinforced effectively and efficiently. It is therefore preferably provided within the context of the method that the respective housing part 1 or 5 and the respective reinforcing elements 8, 9 and 10 and, respectively, 22, 23 and 24 are connected to one another and then or thereupon formed, in particular deep drawn, simultaneously or jointly by means of the forming tool. By this means, the partial regions T1-3 and T4-6 are particularly advantageously provided with the reinforcing elements 8, 9 and 10 and 22, 23 and 24, respectively, that is to say patched, such that the partial regions T1-3 and T4-6 are patched and are thereby reinforced regions.

Overall, it can be seen that the respective housing part 1 or 5 and the reinforcing elements 8, 9, 10 and 22, 23, 24 respectively connected thereto form a housing element which is referred to overall by 25. With the aid of a modular system, different design variants of the housing element 25 can be realized here particularly simply and favorably in terms of time and costs. The modular system comprises, for example, the respective housing part 1 or 5 which is universal across design variants and the respective reinforcing elements 8, 9, 10, 22, 23, 24 which are specific across design variants, specifically in each case in the first embodiment, which is shown in FIG. 2, in the second embodiment, which is shown in FIG. 3, and in the third embodiment, which is shown in FIG. 4. In order therefore to realize, for example, a first of the design variants, it is provided that the respective first design variant of the housing element 25 comprises the respective housing part 1 or 5 and the respective reinforcing elements 8, 9, 10 or 22, 23, 24, wherein, in the first design variant, the reinforcing elements 8, 9 and 10 or 22, 23 and 24 are formed according to the first embodiment, which is shown in FIG. 2. In the second design variant of the housing element 25, it is provided that the second design variant of the housing element 25 comprises the respective housing part 1 or 5 and the respective reinforcing elements 8, 9 and 10 or 22, 23 and 24, but, in the second design variant, the reinforcing elements 8, 9 and 10 or 22, 23 and 24 are formed according to the second embodiment, which is shown in FIG. 3. Accordingly, it is provided, for example, in the third design variant of the housing element 25 that the third design variant of the housing element 25 comprises the respective housing part 1 or 5 and the respective reinforcing elements 8, 9 and 10 or 22, 23 and 24, wherein, in the third design variant, the reinforcing elements 8, 9 and 10 or 22, 23 and 24 are formed according to the third embodiment, which is shown in FIG. 4. This means that the housing part 1 or 5 is optionally reinforced by means of the first embodiment, the second embodiment or the third embodiment of the reinforcing elements 8, 9, 10, 22, 23, 24 in order thereby to appropriately produce the different design variants. As a result, the respective housing part 1 or 5 can be adapted particularly appropriately and favorably in terms of time and costs to different motor vehicles and/or load situations.

LIST OF REFERENCE SIGNS

1 Housing part
2 Storage device
3 Body
4 Storage housing
5 Housing part
6 Receiving space
7 Storage cell
8 Reinforcing element
9 Reinforcing element
10 Reinforcing element
11 Through opening
12 Pattern of perforations
13 Transverse direction of the vehicle
14 Double arrow
15 Double arrow
16 Floor element
17 Floor
18 Interior
19 Footwell
20 Upper side
21 Side sill
22 Reinforcing element
23 Reinforcing element
24 Reinforcing element
25 Housing element
R1-2 Edge region
T1-6 Partial region

What is claimed is:
1. A method for producing at least two design variants of a motor vehicle having a housing element for a storage housing of a storage device, the storage device being configured for storing electrical energy and having a plurality of storage cells arrangeable in a receiving space of the storage housing and in which the electrical energy is stored, the method comprising:
providing a first reinforcing element, in the form of a first perforated plate, which is exclusive to motor vehicle design variants;

providing a second reinforcing element, in the form of a second perforated plate, which is different from the first reinforcing element, and is exclusive to different motor vehicle design variants; and providing at least one basic element which is universal across motor vehicle design variants and from which a housing part, which is universal across motor vehicle design variants and at least partially delimits the receiving space, is produced, wherein:

(i) either the housing part is reinforced by the first reinforcing element, as a result of which a first motor vehicle design variant is produced, or the housing part is reinforced by the second reinforcing element, as a result of which a second motor vehicle design variant is produced;

(ii) the respective reinforcing element intrinsically has a plurality of through openings extending through the perforated plate which are spaced apart from one another and are separated from one another, the plurality of through openings forming a respective pattern of perforations of the respective reinforcing element;

(iii) the reinforcing elements differ from one another in their pattern of perforations and/or in their shape of the respective through openings; and, (iv) the housing part is connected to a self-supporting body of a motor vehicle such that a main floor of the motor vehicle at least partially delimits the receiving space.

2. The method according to claim 1, wherein
the reinforcing elements differ from one another in their:
  wall thicknesses,
  materials from which the reinforcing elements are formed,
  material qualities,
  sizes and/or shapes, and/or
  heat treatments.

3. The method according to claim 1, wherein
in the first motor vehicle design variant, the first reinforcing element is arranged at least in a partial region of the housing part,
in the second motor vehicle design variant, the second reinforcing element is arranged at least in a part of the partial region of the housing part.

4. The method according to claim 1, wherein
the respective reinforcing element is adhesively bonded to the housing part.

5. The method according to claim 1, wherein
the respective reinforcing element is welded to the housing part.

6. The method according to claim 1, wherein
in an installed position of the housing element, the respective reinforcing element is arranged in an outer lateral edge region of the housing part in a transverse direction of the motor vehicle.

7. The method according to claim 1, wherein
when the housing part is reinforced by the respective reinforcing element, the plurality of through openings in the respective reinforcing element are closed by the housing part.

\* \* \* \* \*